Figure 1:
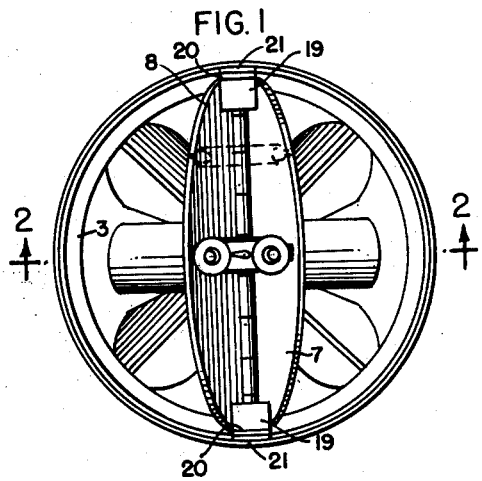

Feb. 5, 1963  E. F. AVERILL  3,076,469
FIRE SAFETY DAMPER UNITS
Filed March 29, 1961  2 Sheets-Sheet 1

INVENTOR:
EUGENE F. AVERILL
BY
ATT'YS

Feb. 5, 1963  E. F. AVERILL  3,076,469
FIRE SAFETY DAMPER UNITS

Filed March 29, 1961  2 Sheets-Sheet 2

INVENTOR:
EUGENE F. AVERILL
BY
ATT'YS

United States Patent Office 3,076,469
Patented Feb. 5, 1963

3,076,469
FIRE SAFETY DAMPER UNITS
Eugene F. Averill, Waterloo, Iowa, assignor to Titus Manufacturing Corporation, Waterloo, Iowa, a corporation of Iowa
Filed Mar. 29, 1961, Ser. No. 99,227
7 Claims. (Cl. 137—74)

This invention, in general, relates to a fire safety damper unit containing a manually operated damper and a fire safety damper. In another aspect of the invention, it relates to improvements in fire dampers which close automatically at a predetermined temperature a gas conveying duct to prevent fire from spreading through a gas distribution system. In a still further aspect of the invention, it relates to improvements in manually operated dampers adapted to be used in conjunction with a fire safety damper.

It is an object of the invention to provide a combined unit with an improved fire safety damper and a manually operated damper.

Another object of the invention is to provide improvements in fire safety dampers for air or other gas conveying or distribution systems.

Still another object of the invention is to provide structural improvements in manually operated dampers for the aforesaid systems.

Other and further objects of the invention will be apparent from the following description and claims together with the accompanying drawing, which, by way of illustration, shows preferred embodiments of the invention and the principles thereof in what I now consider to be the best modes contemplated for applying these principles. Other embodiments of the invention embodying the same or equivalent principles may be used and structural changes may be made as desired by those skilled in the art without departing from the true spirit and principles of the invention.

Briefly, the present invention relates to a damper unit containing a fire safety damper which will close when hot gases or fire is present in the ventilating system. This closing is achieved by the fusing of a fusible element which keeps the fire safety damper open until the element fuses. In the damper unit, the fire safety damper is preferably located above the manually operated dampers when they are mounted in an air duct. The manually operated damper has a plurality of pivotable vanes which can be swung from the open to the closed position by a manually operated means. These vanes each are mounted to pivot about a fixed axis and through reciprocation of a central, reciprocable member are swung between the open and closed positions. This central member is operated by a threaded shaft upon which the central member reciprocates. The reciprocating member has means connecting it to the pivotable vanes to actuate the vanes and cause them to pivot between the open and closed positions.

Figure 2:
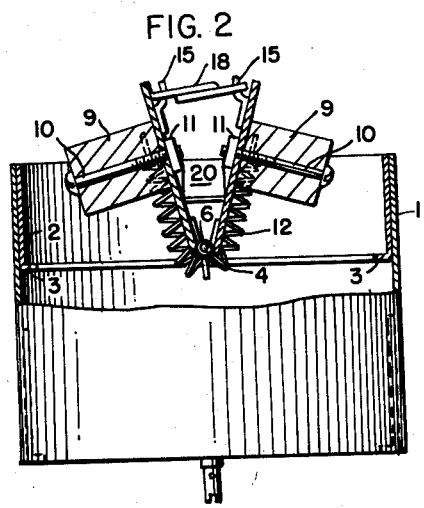
Figure 3:
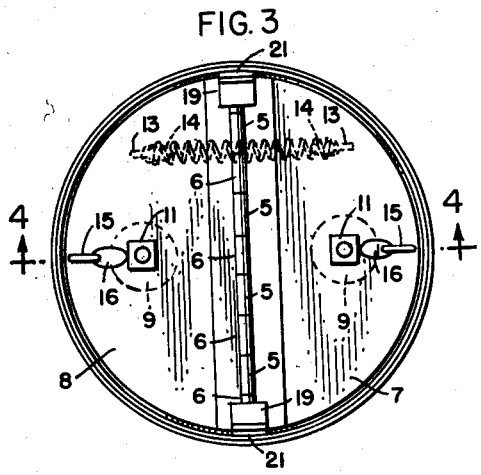
Figure 4:
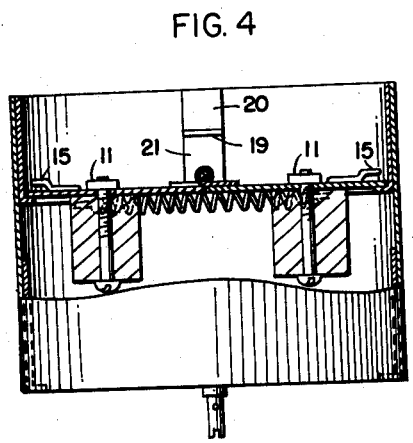
Figure 5:
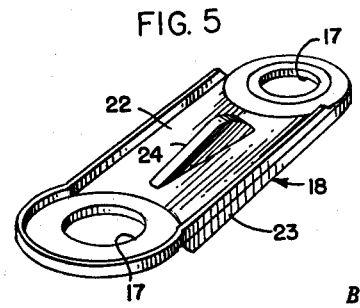
Figure 6:
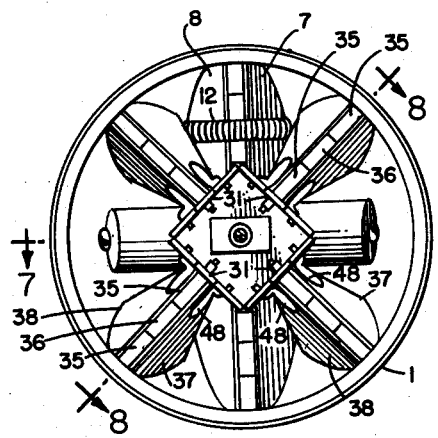
Figure 8:
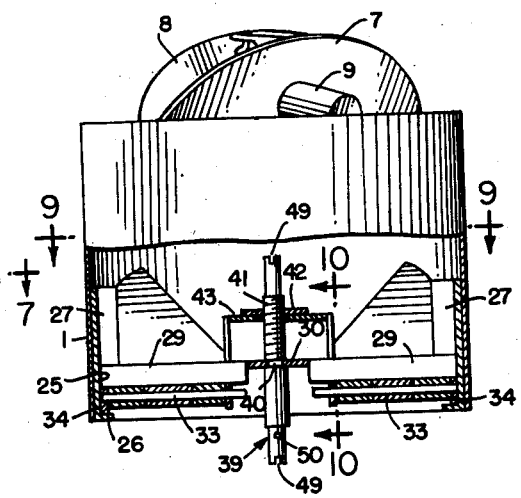
Figure 7:
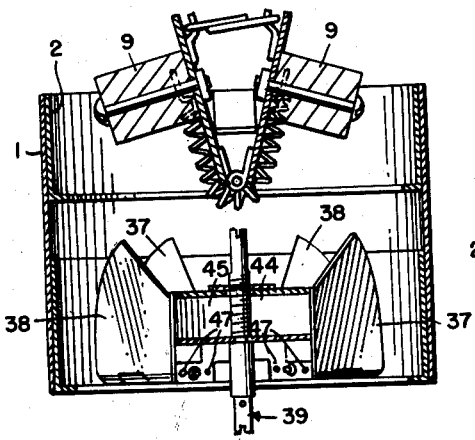
Figure 9:
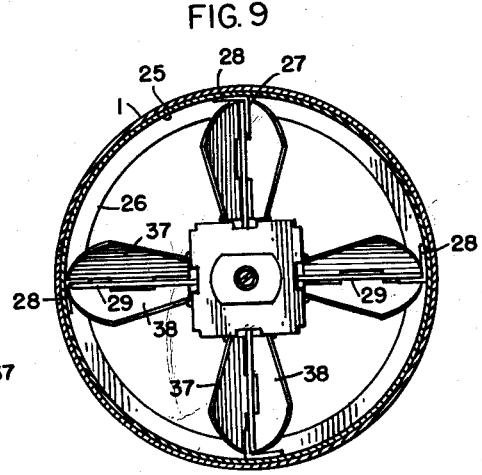
Figure 10:
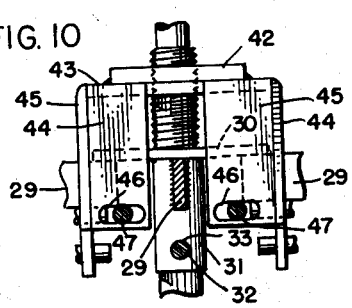

In the drawings:
FIG. 1 is a top plan view of the damper unit;
FIG. 2 is a diametric cross-section taken on section 2—2 of FIG. 1 of the upper half of the damper unit;
FIG. 3 is a top plan view similar to FIG. 1 with the exception that the fire safety damper is in the closed position;
FIG. 4 is a diametric cross-section of the upper half of the damper unit taken on section 4—4 of FIG. 3;
FIG. 5 is a perspective view of the fusible element used to hold the vanes of the fire safety damper in the open position;
FIG. 6 is a bottom plan view of the damper unit;
FIG. 7 is a diametric cross-section of the unit taken on section 7—7 of FIG. 6;
FIG. 8 is a diametric cross-section of the lower half of the damper unit taken on section 8—8 of FIG. 6;
FIG. 9 is a top plan view of the manually operated damper taken on section 9—9 of FIG. 8; and
FIG. 10 is a cross-sectional view of the vane actuating means taken on section 10—10 of FIG. 8.

*Fire Safety Damper*

The fire safety damper is illustrated particularly in FIGS. 1–5. Both dampers are mounted in a sleeve 1 which is cylindrical in shape. This cylindrical sleeve is adapted to be mounted in the duct work of an air distribution system such as an air-conditioning or heating system. In the upper half of the sleeve 1 there is mounted a ring 2 having a bottom peripheral flange 3. Mounted in and extending diametrically across the ring 2 is a pin 4 about which are mounted hinge elements 5 and 6 made in the form of metal loops along a side of each of the damper elements 7 and 8, respectively. These damper elements 7 and 8 are in the form of semicircular discs which, in the closed position, rest on the peripheral flange 3 and close off the cylindrical sleeve 1 against air flow.

Each of the damper elements 7 and 8 has mounted thereon a weight 9 by means of a bolt 10 and nut 11 in each instance. These weights are in the nature of safety devices to help or assist in holding the damper closed when the fusible element has been fused. These weights are particularly important in the event of failure of the spring 12 due to excessive heat from the fire.

The damper elements 7 and 8 are snapped to a closed position by the tension spring 12, the ends of which are mounted upon pins 13 which are offset from and substantially parallel to the plane of the semicircular discs constituting the damper elements 7 and 8. These pins have bases 14 spot-welded to the underside of the damper elements 7 and 8. The opposite or upper surface of the damper elements 7 and 8 each have mounted thereon a pin 15 of similar construction to the pin 13. The bases 16 for the pins 15 are spot-welded to the upper surface of the damper elements 7 and 8, respectively.

Referring to FIG. 5, the fusible element 18 has a pair of apertures 17 at each end thereof. These apertures 17 are slipped over the pins 15, and the fusible element thereby serves the function of holding the damper vanes in the open position. When the temperature in the cylindrical sleeve 1 is high enough to cause the fusible element 18 to fuse, it melts and tears apart. The damper elements or vanes 7 and 8 snap to the closed position. The spring 12 and the weights 9 both function to resist air pressure behind the fire from opening the fire safety damper unit.

When the fusible damper element 18 holds the damper elements 7 and 8 in the open position, they are prevented from falling to one side or the other by means of a support plate 19 mounted on each side of the ring 2 in diametrically opposite positions between the damper units when they are held in their V-shaped open position. The bases 19 are integral with and form a part of the right angular bent plates whose bases 20 are welded to a plate 21 extending longitudinally at opposite sides of the disc 1. The plates 21 are in turn welded to the ring 2 at diametrically opposite sides thereof and have an aperture therein in which is mounted the pin 4 which supports the hinge elements 5, 6 of the damper vanes 7 and 8, respectively.

The fusible element may be made of any suitable construction, the one illustrated in FIG. 5 being but an illustrative embodiment thereof. The fusible element shown in FIG. 5 constitutes an upper clip 22 and a lower clip 23, each of which contains one of the apertures 17. These clips are bonded together by a thin layer of fusible metal between their surfaces, which metal will melt at the desired predetermined fire safety temperature. When the fusible metal melts, the clips slide apart and the damper element swings to a closed position. Each of the clips 22 and 23 has a raised segment 24 filled with the fusible metal to guard against accidental separation of the clips 22 and 23 which might occur without the raised segments 24 through sheer forces applied along the surfaces of the clips 22 and 23 held together only by the thin layer of fusible metal.

*Manually Operated Damper Unit*

The manually operated damper unit is mounted on a ring 25 situated in the lower half of the cylindrical sleeve 1. The ring 25 has a bottom, peripheral flange 26 extending therearound. Four support plates 27 are mounted at 90 degree intervals with the plates projecting inwardly. These plates are mounted on the ring 25 by welding the bases 28 of the support plates 27 to the ring 25. Each of the support plates 27 has a radial arm projecting inwardly therefrom and attached to the support plates by suitable means such as spot-welding. The support plates 27 and the radial arms 29 form a fixed support for a centrally disposed bearing plate 30 lying in a plane transverse to the axis of the sleeve 1. The bearing plate 30 is attached to the radial arms 29 by projecting the arms 29 through slots in downwardly depending arms 31 made integral with the bearing plate 30. The radial arms 29 are seated in said slots and welded along the slots to the downwardly depending arms 31 and/or to the bearing plate 30 along slots in the latter, each of which also seats one radial arm 29. Adjacent the bottom of each downwardly depending arm 31 is an aperture 32 which serves as a support for an end of a pin 33. The outer end of each pin 33 is supported in an apertured pin support 34 which is attached to or made integral with the ring 25 at spaced 90 degree intervals.

Each quadrant of the air flow aperture through the manually operated damper is adapted to be closed off by a pair of vanes 37, 38, which are hingedly mounted by means of hinge elements 35 and 36, respectively, on the pins 33. The construction and mounting of each vane pair covering a particular quadrant is the same as the other vane pairs and, accordingly, the following description will relate to only one vane pair with the understanding that it applies to the other three vane pairs.

The manually operated damper has mounted therein a central, longitudinally extending shaft 39 having a groove 40 rotatably supported in the bearing plate 30. A segment 41 of the shaft 39 is externally threaded, and this section is threadedly engaged in an internally threaded nut 42 fixedly mounted on the top 43 of a reciprocable vane actuator element. The vane actuator element is made up of the apertured top 43 and on each side thereof two downwardly depending segments 44 and 45, the sides of which ride adjacent to the depending arms 31 of the fixed bearing 30. This precludes the vane actuator element from rotating when the shaft 39 is turned. Thus, upon rotation of the shaft 39, the top 43 and the depending segments 44 and 45 on each side of the top 43 will reciprocate with respect to the fixedly mounted bearing 30 and supports therefor.

Each depending segment 44 and 45 has adjacent the bottom thereof a transverse slot 46. In each slot rides an offset pin 47, which in turn has its base attached to the underside of one of the vanes 37, 38. These pins are offset with respect to the pivot axis of each vane so that the pin, riding in the slot 46, causes the vane to pivot when the vane actuator element is reciprocated. By raising the vane actuator element to its rearmost position, the vanes are held in an open position substantially as shown in the drawings. When the actuator element is moved to its forwardmost position, the vane elements pivot downwardly and form a closure in the ring 25 with the vane actuator elements resting on flange 26. The vanes, in this position, thereby close off air flow through the area between the ring 25 and the central, actuating portion for the vanes, and thereby substantially cut off all air flow through the damper unit. The horizontal slots 46 in each of the downwardly depending segments 44 and 45 form a sliding fit between the longitudinally reciprocable vane actuator element and the pins which travel in an arcuate path when the vanes are pivoted between the open and the closed position.

A convenient way for adjusting the damper to one of its desired positions is by means of a screwdriver which can be inserted in either of the slots 49 at the upper or lower ends of the shaft 39. If desired, the shaft 39 may have a transverse, small hole 50 at the lower end of the shaft.

The small hole 50 at the lower end of the shaft 39 may be used to attach an extension rod (not shown) to the rotatable shaft 39 in cases where the damper is placed at an unaccessible distance in a duct. The extension rod is of a known type, i.e., one with a sleeve which fits around the lower end of the shaft with a pair of holes in the sleeve through which is inserted a cotter pin which also passes through the transverse, small hole 50 at the lower end of the shaft 39. The extension rod depends downwardly through the duct to a point where it is accessible to a person who wishes to adjust the position of the vanes of the manually operated damper.

Thus, it will be seen from the foregoing description of the invention, that there has been provided a damper unit which can be adjusted to any desired air flow velocity with the incorporated feature of a fire safety damper which automatically closes off the damper unit in the event a fire occurs in the room which is being ventilated by the duct work in which the damper is mounted. The invention may be readily adapted to other ductwork shapes and may take the form of a square or rectangular damper instead of a damper adapted to be fitted into a round duct without departing from the spirit and scope of the invention. The invention and the principles embodied therein are not limited to the embodiments illustrated and described, the true spirit and scope of which invention and principles are set forth in the following claims.

The invention is hereby claimed as follows:

1. A fire safety damper comprising a hollow damper housing, a pair of pivotable vane elements pivotally mounted in said housing, said vane elements adapted to substantially completely close off said housing to gas flow when the elements are in the closed position, means for holding the elements in an open position comprising a fusible link connected to the respective vane elements when they are in the open position, and bias means connecting said vane elements and adapted to snap said vane elements to the closed position when said fusible element is melted.

2. A fire safety damper comprising a hollow damper housing, a pair of pivotable vane elements pivotally mounted in said housing, said vane elements adapted to substantially completely close off said housing to gas flow when the elements are in the closed position, means for holding the elements in an open position comprising a fusible link connected to the respective vane elements when they are in the open position, bias means connecting said vane elements and adapted to snap said vane elements to the closed position when said fusible element is melted, and a weight on the under surface of each vane element adapted to hold the vane elements in the closed position when the fusible element has melted and said bias means has snapped it to a closed position.

3. A fire safety damper comprising a hollow damper housing, a pair of pivotable vane elements pivotally mounted in said housing, said vane elements adapted to substantially completely close off said housing to gas flow when the elements are in the closed position, a pin on each vane element, a fusible link with a pair of apertures therein, said vane elements being connected and held in the open position by said fusible link with one of said pins in each aperture, and bias means connecting said vane elements and adapted to snap said vane elements to the closed position when said fusible element is melted.

4. The damper of claim 3 wherein said bias means is a coil spring with one end thereof connected to one of said vane elements and the other end thereof connected to said other vane element.

5. The damper of claim 3 wherein said bias means is a coil spring with one end thereof connected to one of said vane elements and the other end thereof connected to said other vane element, and a weight on each vane element for holding the vane element in the closed position when the fusible link melts and the spring snaps said elements to a closed position.

6. In a fire safety damper, the combination comprising a pair of vanes pivotable about a common axis and held in the open position in substantially V-relationship by means of a connecting fusible element extending therebetween, a support plate extending between said vanes in the V-position adapted to hold said vanes against pivoting in one direction or the other, a coil tension spring attached to each of said vane elements and providing a spring bias to snap said elements to a closed position when the fusible element melts, and a weight on each vane for holding said vane in closed position when the fusible element melts.

7. A fire safety damper comprising a hollow, cylindrical housing, a pair of semi-circular discs pivotally mounted in said housing, said discs being pivotable between a closed position in which they lie in a common plane transverse to the axis of said cylinder and close off said housing to air flow therethrough and an open position with each disc at an angle to said common plane, a fusible link connecting said discs to hold them in the open position, and spring bias means connecting said discs for snapping said discs to said closed position when said fusible element melts.

References Cited in the file of this patent
UNITED STATES PATENTS

| | | |
|---|---|---|
| 824,932 | Jenczewsky | July 3, 1906 |
| 1,022,119 | Barton | Apr. 2, 1912 |
| 1,818,609 | Dickstein | Aug. 11, 1931 |
| 1,938,967 | Lovekin | Dec. 12, 1933 |
| 2,012,873 | Gillen | Aug. 27, 1935 |
| 2,094,707 | Jones | Oct. 5, 1937 |
| 2,559,336 | Arata | July 3, 1951 |